(12) United States Patent
Smith

(10) Patent No.: US 12,715,371 B2
(45) Date of Patent: Aug. 25, 2026

(54) CAMERA MOUNT

(71) Applicant: Shock Therapy Suspension, Inc., Duluth, GA (US)

(72) Inventor: Justin Smith, Wittmann, AZ (US)

(73) Assignee: SHOCK THERAPY SUSPENSION, INC., Phoenix, AZ (US)

( * ) Notice: Subject to any disclaimer, the term of this patent is extended or adjusted under 35 U.S.C. 154(b) by 158 days.

(21) Appl. No.: 18/893,269

(22) Filed: Sep. 23, 2024

(65) Prior Publication Data

US 2026/0084629 A1 Mar. 26, 2026

(51) Int. Cl.

| | |
|---|---|
| ***G03B 17/56*** | (2021.01) |
| ***B60R 11/04*** | (2006.01) |
| *B60R 11/00* | (2006.01) |

(52) U.S. Cl.
CPC ............ *B60R 11/04* (2013.01); *G03B 17/561* (2013.01); *B60R 2011/0003* (2013.01); *B60R 2011/005* (2013.01)

(58) Field of Classification Search
CPC .................................................... G03B 17/561
See application file for complete search history.

(56) References Cited

U.S. PATENT DOCUMENTS

| | | | |
|---|---|---|---|
| 10,576,905 | B1 | 3/2020 | Macneil et al. |
| 10,717,396 | B2 | 7/2020 | Macneil et al. |
| 10,946,810 | B2 | 3/2021 | Macneil et al. |
| 11,038,996 | B2 | 6/2021 | Iverson et al. |

OTHER PUBLICATIONS

Richards (post titled “Cup Holder Camera Mount” dated Dec. 29, 2016 on HomeMade Tools.net forum < https://www.homemadetools.net/forum/cup-holder-camera-mount-55863> (Year: 2016).*
“Peter von Panda” (video titled “WeatherTech CupFone is a Cupholder Mount for Your Phone” dated Mar. 25, 2019 < https://www.youtube.com/watch?v=cj7hAgvmtzc>) (Year: 2019).*
IBOLT Action Camera Cup Holder Mount product page at <https://iboltmounts.com/products/ibolt-action-camera-inch-20-bizmount-cup-holder-mount> archive.org dated May 25, 2024 (Year: 2024).*

* cited by examiner

*Primary Examiner* — Leon W Rhodes, Jr.
(74) *Attorney, Agent, or Firm* — Schmeiser Olsen

(57) ABSTRACT

A camera mount for a vehicle, such as an off road vehicle, is provided. A camera is secured to an upper end of the camera mount. A lower end of the camera mount is positioned within a cylindrical cup holder provided within the interior cabin of the vehicle via a cylindrical base member. A support rod member extends upwardly from the cylindrical base member and supports the camera at the upper end of the camera mount on the support rod member. A central bore portion is provided within the cylindrical base member to receive the support rod member. The cylindrical base member is provided with spring-biased shims or actuatable shims to securely position the camera mount with the cylindrical cup holder.

20 Claims, 7 Drawing Sheets

CAMERA MOUNT

BACKGROUND OF THE INVENTION

Technical Field

This invention relates generally to a camera mount for a vehicle and more particularly to a camera mount for a cup holder of a vehicle. The camera mount enables a 360 degree camera to be mounted at an elevated position within the interior cabin of the vehicle.

State of the Art

Vehicles, including off road vehicles (ORVs), such as utility terrain vehicles (UTVs) are provided with cup holders within an interior cabin of the vehicle. Various camera mounts for cup holders have been provided to secure a camera within the interior cabin of the vehicle. However, these camera mounts must be stable while providing a 360° view of the vehicle.

Accordingly, there is a need for a camera mount for a cupholder that allows a 360° view of the vehicle cabin.

SUMMARY OF THE INVENTION

The present invention relates to a camera mount for an action camera in a vehicle. The camera mount mounts in the cup holder of a vehicle, such as a UTV, and allows for a 360° view of the vehicle cabin.

An embodiment includes a camera mount for a camera in a vehicle, the camera mount comprising: a lower end of the camera mount positioned within a cup holder provided within the interior cabin via a base member; a central bore portion provided within the base member to receive a support rod member therein, wherein the support rod member extends upwardly from the base member; and an upper end of the camera mount, wherein the camera is secured at the upper end on the support rod member.

The base member may be provided with an upper annular lip portion on an upper end portion thereof. An axially extending, protruding key portion may be provided on the base member. A plurality of spring-biased elongated shims may be circumferentially provided about an axially extending cylindrical portion of the base member. The plurality of spring-biased elongated shims may be received within a plurality of longitudinally extending slotted portions provided within the axially extending cylindrical portion of the base member. The plurality of longitudinally extending slotted portions may be arranged circumferentially about the axially extending cylindrical portion. A retaining end plate may be provided on a lower end portion of the base member to retain the plurality of spring-biased elongated shims within the plurality of longitudinally extending slotted portions.

A pair of rib portions may be provided to extend longitudinally along opposed side surfaces of each of the plurality of spring-biased elongated shims. A pair of inwardly extending retaining rib portions are provided along each of the plurality of longitudinally extending slotted portions to retain the pair of rib portions of each of the plurality of spring-biased elongated shims. A pair of recessed aperture portions may be provided on a rear surface portion of each of the plurality of spring-biased elongated shims. Each of the pair of recessed aperture portions may receive respective coil spring elements therein. Each of the plurality of spring-biased elongated shims may be respectively provided with a frontal surface portion extending outwardly beyond the axially extending cylindrical portion of the base member. A tapered surface portion may be provided on a lower end portion of each of the plurality of spring-biased elongated shims.

A rotatable cam member is provided within the cylindrical base member, wherein the support rod member is fixedly received therein. The rotatable cam member may actuate a plurality of shim members positioned within the base member, wherein the plurality of shim members is outwardly actuatable to engage an inner cylindrical surface the cup holder.

Another embodiment includes a method of using a camera mount for a camera in a vehicle, the method comprising: positioning a lower end of the camera mount within a cup holder provided within an interior cabin of the vehicle via a base member; providing a central bore portion within the base member to receive a support rod member; upwardly extending the support rod member from the base member; and securing the camera at an upper end of the camera mount on the support rod member.

The method may further comprise providing a plurality of spring-biased elongated shims circumferentially about an axially extending cylindrical portion of the base member. The method may further comprise providing the plurality of spring-biased elongated shims within a plurality of longitudinally extending slotted portions along the axially extending cylindrical portion of the base member. The method may further comprise providing a retaining end plate on a lower end portion of the base member to retain the plurality of spring-biased elongated shims within the plurality of longitudinally extending slotted portions. The method may further comprise providing a pair of rib portions longitudinally along opposed side surfaces of each of the plurality of spring-biased elongated shims and providing a pair of inwardly extending retaining rib portions along each of the plurality of longitudinally extending slotted portions to retain the pair of rib portions of each of the plurality of spring-biased elongated shims.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
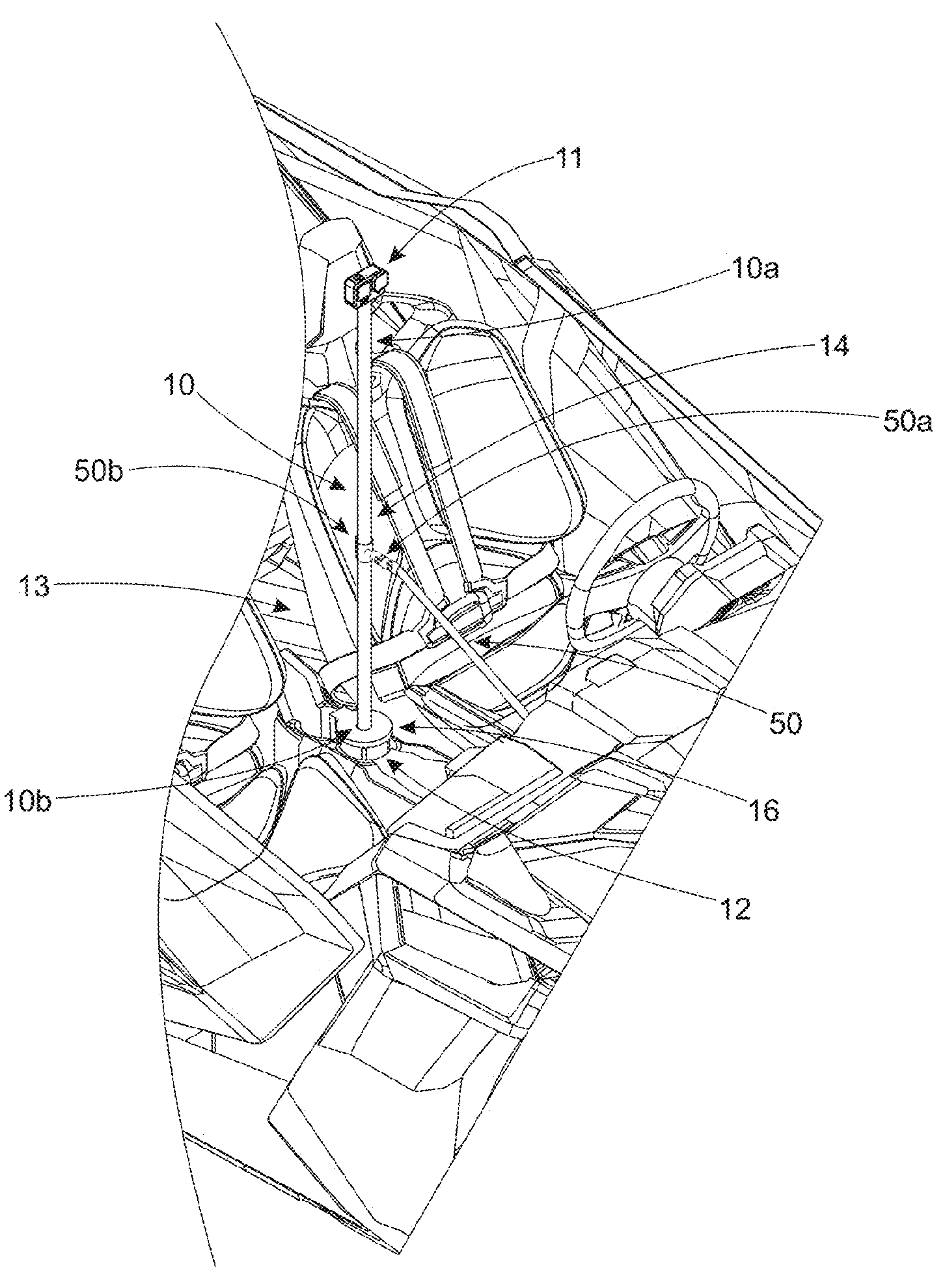
FIG. 1 is a perspective view of a camera mount within a cabin of a vehicle according to an embodiment.
Figure 2A:
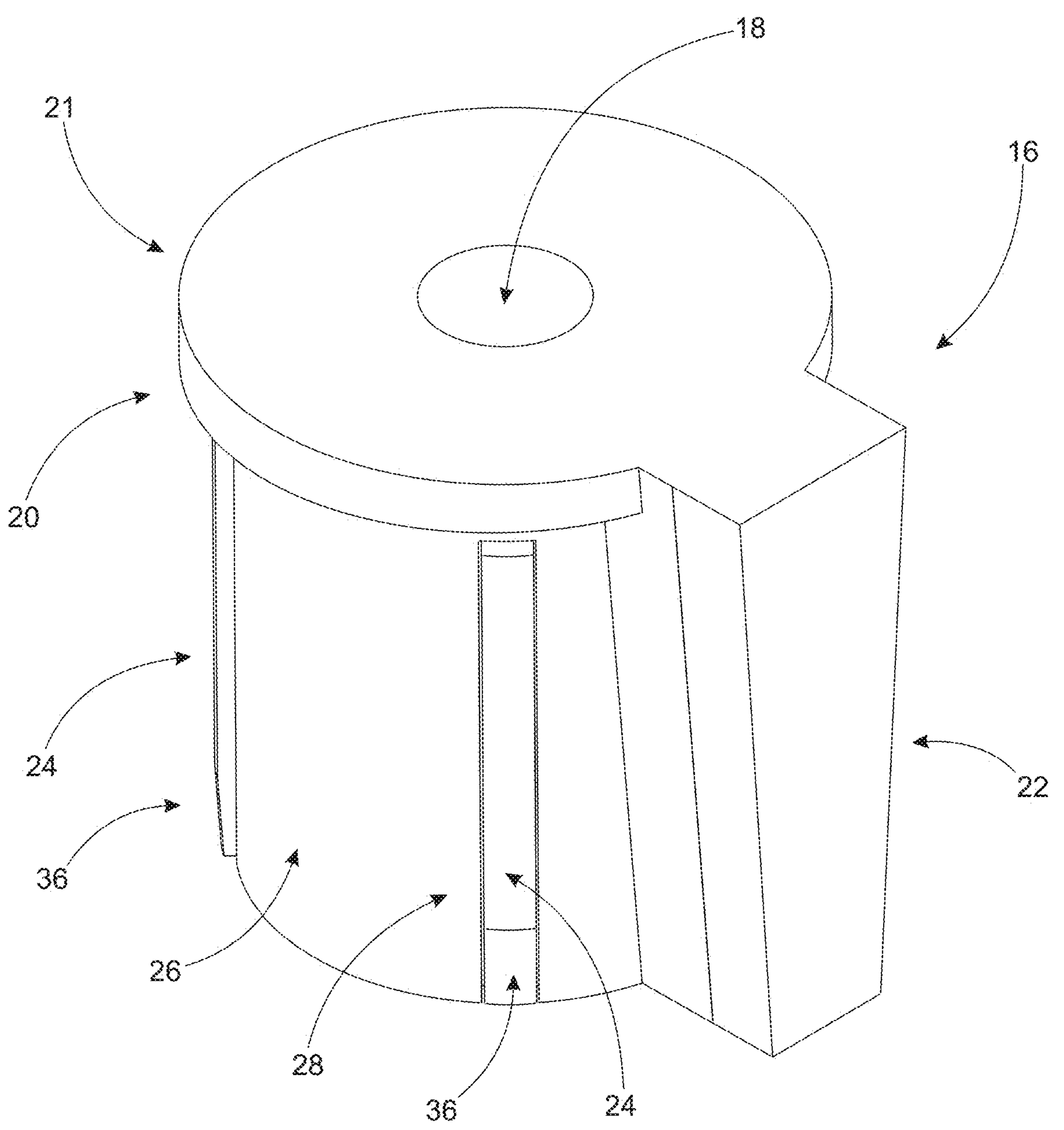
FIG. 2A is a top perspective view of a cylindrical base member of a camera mount according to an embodiment.
Figure 2B:
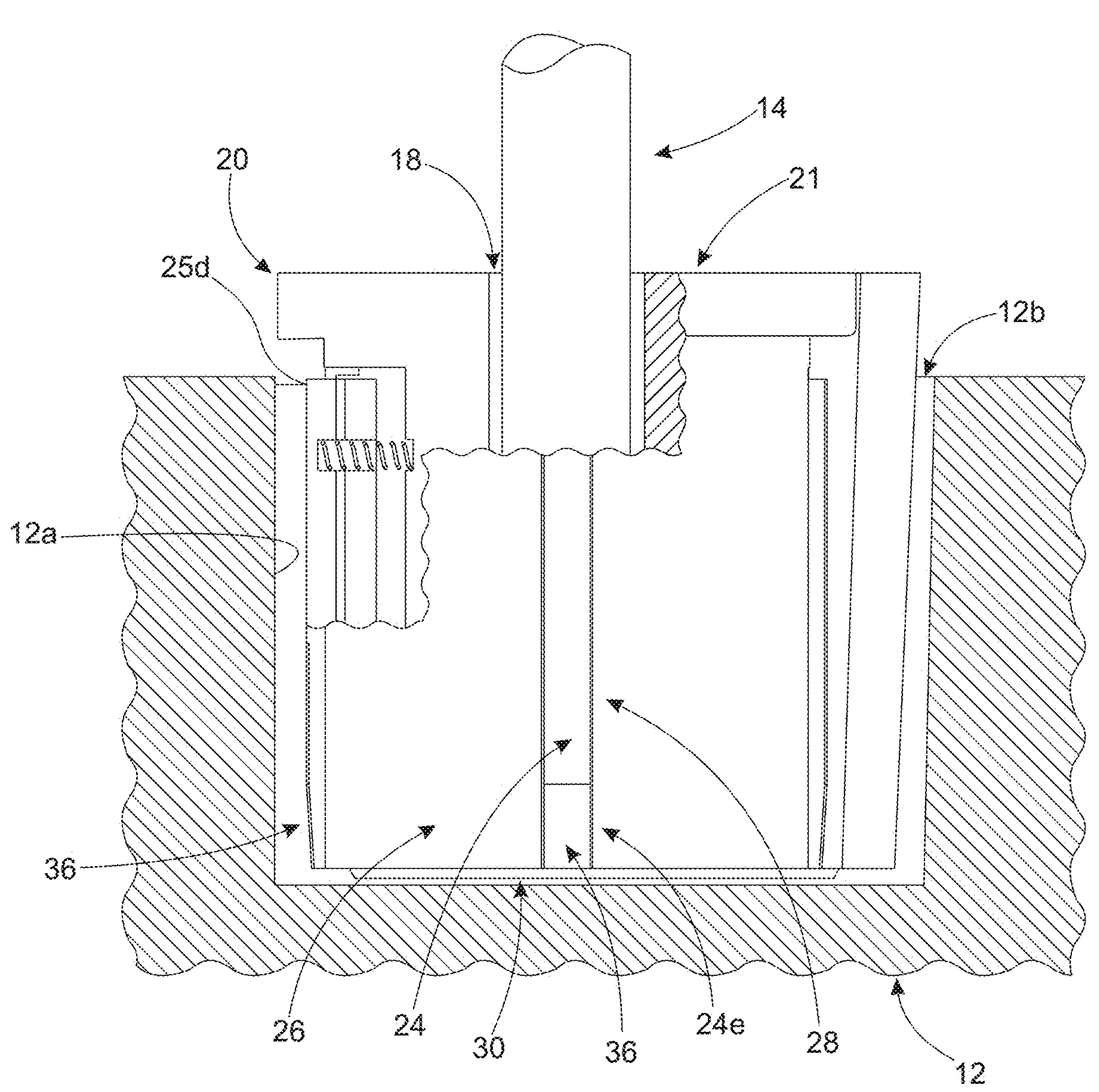
FIG. 2B is a partial cross-sectional view of a cylindrical base member of a camera mount according to an embodiment.

As discussed above, embodiments of the present invention relate to a camera mount for cameras, such as action cameras, including a Go Pro. The camera mount mounts in the cup holder of a vehicle, such as a UTV, and allows for a 360° view of the vehicle cabin. The camera mount may be spring loaded to fit tightly within the cup holder of the vehicle. The camera mount may also be adjustable in height. The spring-loaded camera mount is secured via spring-biased shims as it is pushed into the cup holder. The camera mount may have an actuatable component which is selectively rotated to fit tightly within the cup holder of the vehicle.

Referring to FIGS. 1-4, a camera mount 10 is provided within an interior cabin 13 of a vehicle. A camera 11 is secured to an upper end 10*a* of the camera mount 10 by a standard rotatable connection for mounting the camera 11. A lower end 10*b* of the camera mount 10 is positioned within a cup holder, such as cylindrical cup holder 12 provided within the interior cabin 13 via a base member, such as cylindrical base member 16. A support rod member 14 extends upwardly from the cylindrical base member 16 and supports the camera 11 at the upper end 10*a* of the camera mount 10. The support rod member 14 is of a height to provide the camera 11 with a 360° view of the interior cabin 13. A central bore portion 18 is provided within the cylindrical base member 16 to receive the support rod member 14. The support rod member 14 may have a plurality of tubular members (not shown) that are telescopically arranged for height adjustment.

The cylindrical base member 16 is provided with an upper annular lip portion 20 on an upper end portion 21 thereof. An axially extending, protruding key portion 22 is provided on the cylindrical base member 16 and is received within a complementary recessed portion 12*b* provided within an inner cylindrical surface 12*a* the cylindrical cup holder 12.

A plurality of spring-biased elongated shims 24 are circumferentially provided about an axially extending cylindrical portion 26 of the cylindrical base member 16. The plurality of spring-biased elongated shims 24 are received within a plurality of longitudinally extending slotted portions 28 provided within the axially extending cylindrical portion 26 of the cylindrical base member 16. The plurality of longitudinally extending slotted portions 28 are arranged circumferentially about the axially extending cylindrical portion 26.

A retaining end plate 30 is provided on a lower end portion 32 of the cylindrical base member 16. The retaining end plate 30 holds the plurality of spring-biased elongated shims 24 within the plurality of longitudinally extending slotted portions 28 provided about the axially extending cylindrical portion 26.

Figure 3:
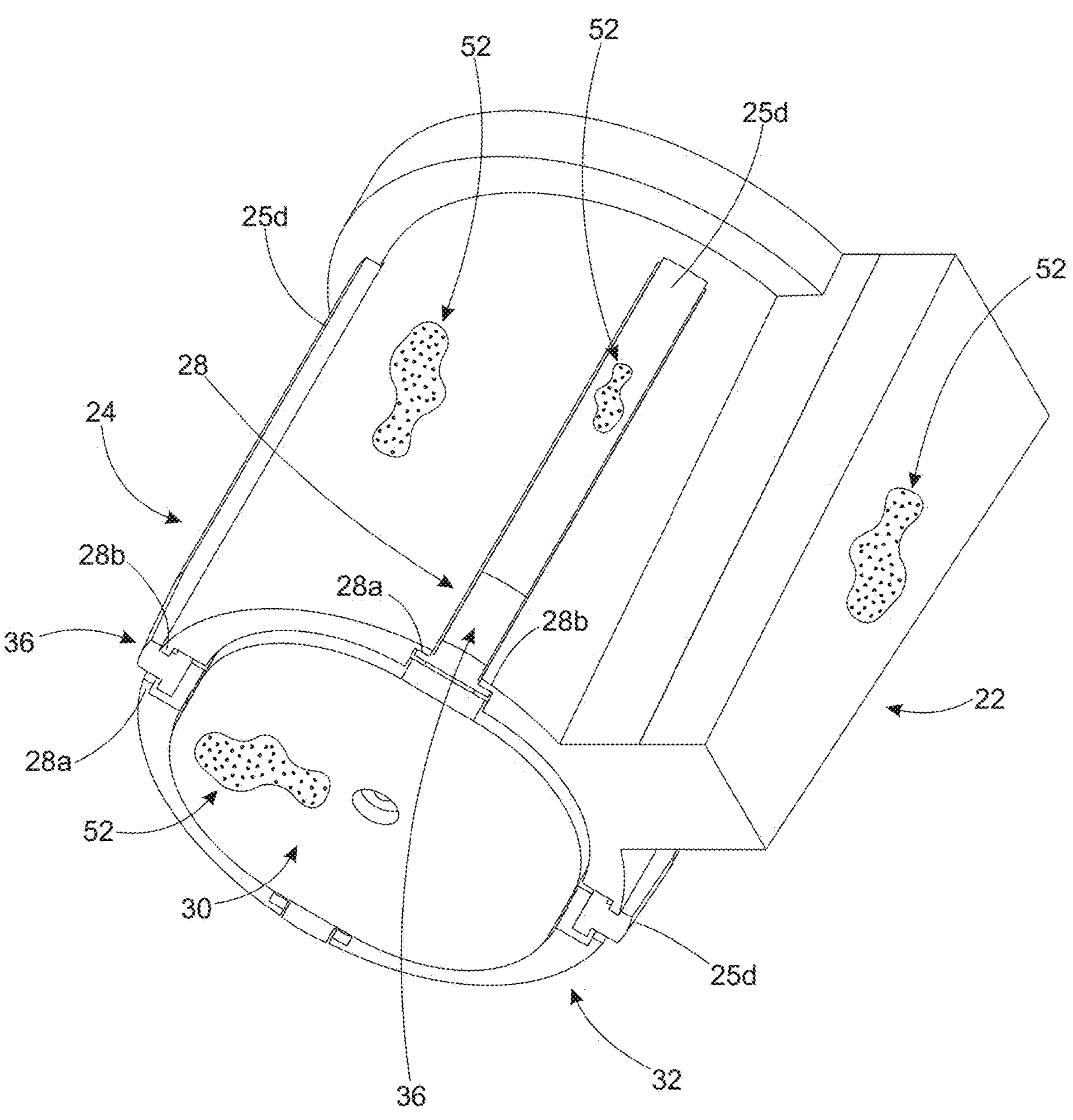
FIG. 3 is a bottom perspective view of a cylindrical base member of a camera mount according to an embodiment.
Figure 4:
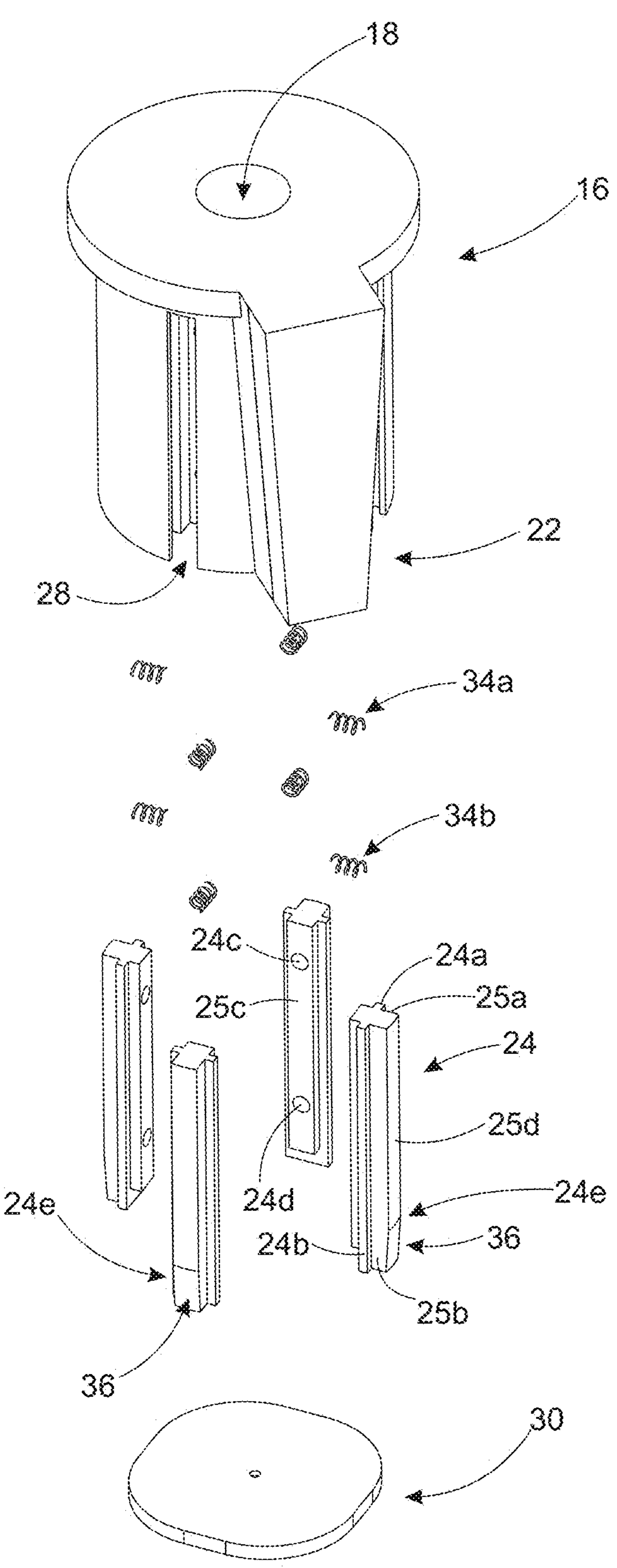
FIG. 4 is an exploded perspective top view of a cylindrical base member of a camera mount according to an embodiment.

As shown in FIG. 4, each of the plurality of spring-biased elongated shims 24 is provided with a pair of rib portions 24*a*, 24*b* extending longitudinally along opposed side surfaces 25*a*, 25*b* of each of the plurality of spring-biased elongated shims 24. The pair of rib portions 24*a*, 24*b* are respectively engaged by a pair of inwardly extending retaining rib portions 28*a*, 28*b* (See FIG. 3) provided along each of the plurality of longitudinally extending slotted portions 28. The pair of rib portions 24*a*, 24*b* are retained by the pair of inwardly extending retaining rib portions 28*a*, 28*b*.

As shown in FIG. 4, a pair of recessed aperture portions 24*c*, 24*d* are provided on a rear surface portion 25*c* of each of the plurality of spring-biased elongated shims 24. Each pair of recessed aperture portions 24*c*, 24*d* receive respective coil spring elements 34*a*, 34*b* therein. The coil spring elements 34*a*, 34*b* bias the plurality of spring-biased elongated shims 24 outwardly to engage the inner cylindrical surface 12*a* of the cylindrical cup holder 12.

Each of the plurality of spring-biased elongated shims 24 respectively have a frontal surface portion 25*d* that extends outwardly beyond the axially extending cylindrical portion 26 of the cylindrical base member 16. The frontal surface portion 25*d* of each of the plurality of spring-biased elongated shims 24 positively engage the inner cylindrical surface 12*a* of the cylindrical cup holder 12. A tapered surface portion 36 is provided on a lower end portion 24*e* of each of the plurality of spring-biased elongated shims 24 in order to be slidably received against the inner cylindrical surface 12*a* of the cylindrical cup holder 12.

Figure 5:
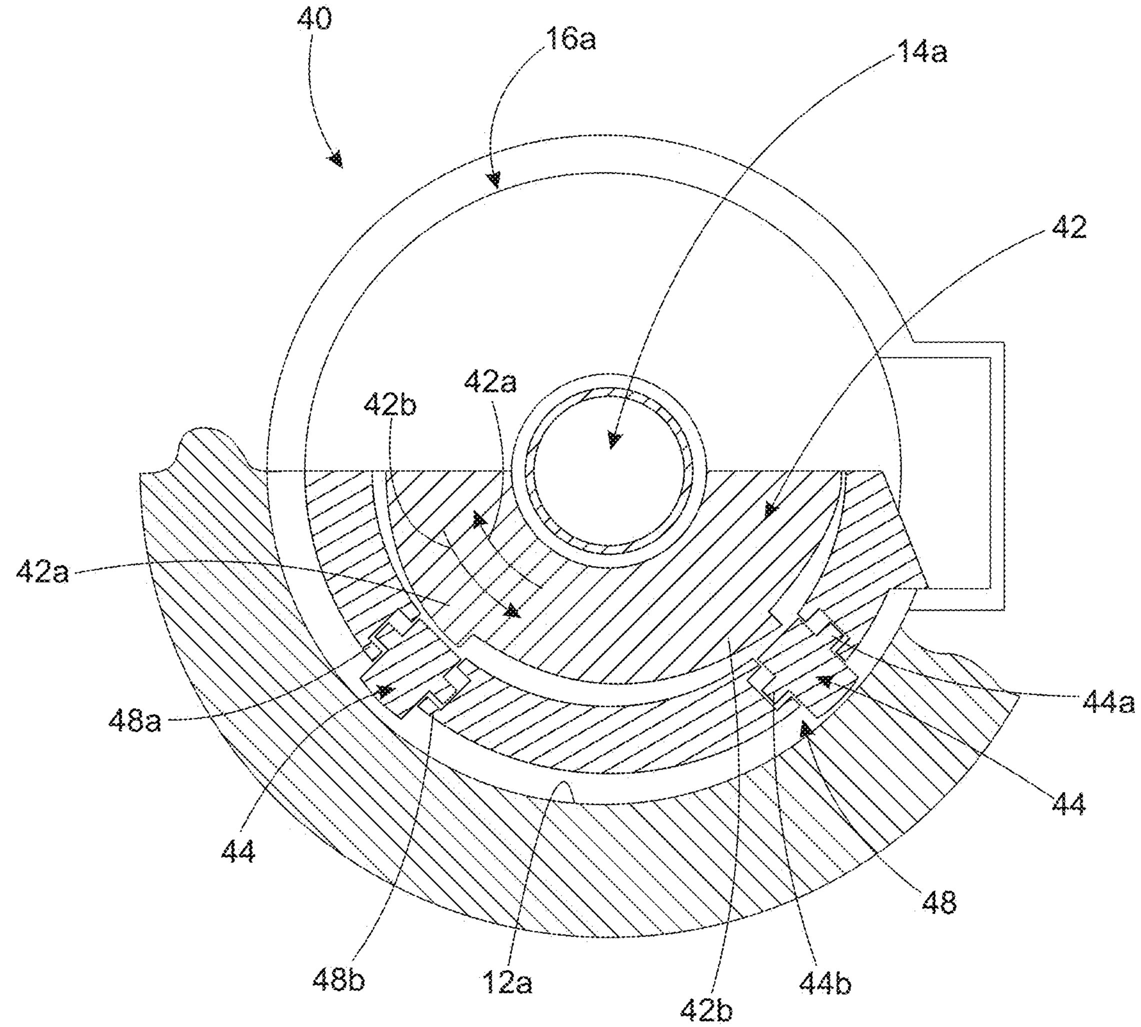
FIG. 5 is a partial cross-sectional view of a cylindrical base assembly of a camera mount according to an embodiment.

In another embodiment shown in FIG. 5, a camera mount 40 is provided with a rotatable cam member 42 within a cylindrical base assembly 16*a* in which a tubular support rod element 14*a* is fixedly received therein. By twisting the tubular support rod element 14*a* in a clockwise direction 42*a*, the rotatable cam member 42 actuates a plurality of shim members 44 which are positioned within the cylindrical base assembly 16*a* outwardly to engage the inner cylindrical surface 12*a* of the cylindrical cup holder 12. By twisting the tubular support rod element 14*a* in a counterclockwise direction 42*b*, the plurality of shim members 44 are released from their engagement with the inner cylindrical surface 12*a* of the cylindrical cup holder 12. Each of the plurality of shim members 44 are provided with opposed rib elements 44*a*, 44*b* held by opposed retaining lip portions 48*a*, 48*b* provided along each of a plurality of slotted openings 48 that respectively receive each of the plurality of shim members 44.

In another embodiment, as shown in FIG. 1, a stabilizer member 50 may be provided to brace and/or triangulate the support rod member 14 within cylindrical base member 16 for additional stability and/or support. The stabilizer member 50 may be secured to the support rod member 14 at one end via a pivotable connection 50*a*. The pivotable connection 50*a* may be secured to the support rod member 14 via a cylindrical member 50*b* fixed about the support rod member 14. The stabilizer member 50 may be secured at the other end thereof to a location within the interior cabin 13 of a vehicle by, for example, using hook and loop fasteners, threaded fasteners, tape, suction cups, snap-in clips, and/or roll bar rings. Suitable locations within the interior cabin 13 include seats and/or seatbelts.

In another embodiment, as shown in FIG. 3, a frictional surface (e.g., grip tape, sandpaper) and/or a deformable material (e.g., rubber, plastic foam) 52 may be provided on any of the exterior surfaces engaging the cylindrical cup holder 12. The exterior surfaces engaging the cylindrical cup holder 12 include the frontal surface portion 25*d*, the axially extending cylindrical portion 26, the axially extending, protruding key portion 22, and/or the retaining plate 30.

Figure 6:
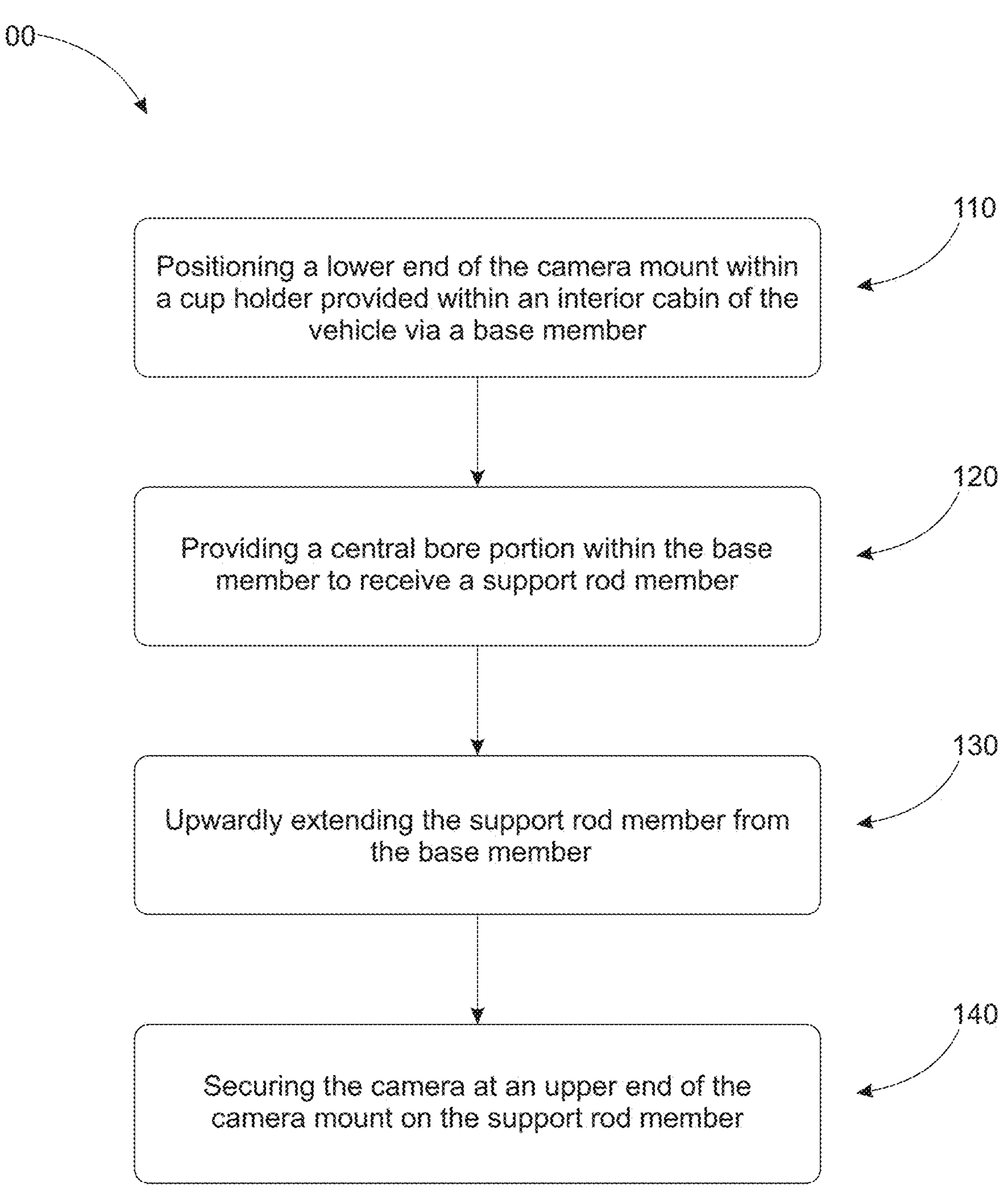
FIG. 6 is a block diagram of steps of a method of using a camera mount for a camera in a vehicle according to an embodiment.

FIG. 6 is a block diagram of steps of a method 100 of using a camera mount for a camera in a vehicle. Method 100 comprises using a camera mount for a camera in a vehicle, the method comprising: positioning a lower end of the camera mount within a cup holder provided within an interior cabin of the vehicle via a base member (Step 110);

providing a central bore portion within the base member to receive a support rod member (Step 120); upwardly extending the support rod member from the base member (Step 130); and securing the camera at an upper end of the camera mount on the support rod member (Step 140).

The method may further comprises providing a plurality of spring-biased elongated shims circumferentially about an axially extending cylindrical portion of the base member. The method further comprises providing the plurality of spring-biased elongated shims within a plurality of longitudinally extending slotted portions along the axially extending cylindrical portion of the base member. The method further comprises providing a retaining end plate on a lower end portion of the base member to retain the plurality of spring-biased elongated shims within the plurality of longitudinally extending slotted portions. The method further comprises providing a pair of rib portions longitudinally along opposed side surfaces of each of the plurality of spring-biased elongated shims and providing a pair of inwardly extending retaining rib portions along each of the plurality of longitudinally extending slotted portions to retain the pair of rib portions of each of the plurality of spring-biased elongated shims.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A camera mount for a camera in a vehicle having an interior cabin, the camera mount comprising:

a lower end of the camera mount positioned within a cup holder provided within the interior cabin via a base member;

a central bore portion provided within the base member to receive a support rod member therein, wherein the support rod member extends upwardly from the base member; and an upper end of the camera mount, wherein the camera is secured at the upper end on the support rod member; wherein the support rod is of a heigh to provide the camera with a 360° view of the interior cabin.

2. The camera mount of claim 1, wherein the base member is provided with an upper annular lip portion on an upper end portion thereof.

3. The camera mount of claim 1, wherein an axially extending, protruding key portion is provided on the base member.

4. The camera mount of claim 1, wherein a plurality of spring-biased elongated shims are circumferentially provided about an axially extending cylindrical portion of the base member.

5. The camera mount of claim 4, wherein the plurality of spring-biased elongated shims are received within a plurality of longitudinally extending slotted portions provided within the axially extending cylindrical portion of the base member.

6. The camera mount of claim 5, wherein the plurality of longitudinally extending slotted portions are arranged circumferentially about the axially extending cylindrical portion.

7. The camera mount of claim 6, wherein a retaining end plate is provided on a lower end portion of the base member to retain the plurality of spring-biased elongated shims within the plurality of longitudinally extending slotted portions.

8. The camera mount of claim 5, wherein a pair of rib portions are provided to extend longitudinally along opposed side surfaces of each of the plurality of spring-biased elongated shims.

9. The camera mount of claim 8, wherein a pair of inwardly extending retaining rib portions are provided along each of the plurality of longitudinally extending slotted portions to retain the pair of rib portions of each of the plurality of spring-biased elongated shims.

10. The camera mount of claim 9, wherein a pair of recessed aperture portions are provided on a rear surface portion of each of the plurality of spring-biased elongated shims.

11. The camera mount of claim 10, wherein each of the pair of recessed aperture portions receive respective coil spring elements therein.

12. The camera mount of claim 4, wherein each of the plurality of spring-biased elongated shims is respectively provided with a frontal surface portion extending outwardly beyond the axially extending cylindrical portion of the base member.

13. The camera mount of claim 12, wherein a tapered surface portion is provided on a lower end portion of each of the plurality of spring-biased elongated shims.

14. The camera mount of claim 1, wherein a rotatable cam member is provided within the base member, wherein the support rod member is fixedly received therein.

15. The camera mount of claim 14, wherein the rotatable cam member actuates a plurality of shim members positioned within the base member, wherein the plurality of shim members is outwardly actuatable to engage an inner cylindrical surface of the cup holder.

16. A method of using a camera mount for a camera in a vehicle, the method comprising:

positioning a lower end of the camera mount within a cup holder provided within an interior cabin of the vehicle via a base member;

providing a central bore portion within the base member to receive a support rod member;

securing the camera at an upper end of the camera mount on the support rod member; and upwardly extending the support rod member from the base member to a height to provide the camera with a 360° view of the interior cabin.

17. The method of claim 16, further comprising providing a plurality of spring-biased elongated shims circumferentially about an axially extending cylindrical portion of the base member.

18. The method of claim 17, further comprising providing the plurality of spring-biased elongated shims within a plurality of longitudinally extending slotted portions along the axially extending cylindrical portion of the base member.

19. The method of claim 18, further comprising providing a retaining end plate on a lower end portion of the base member to retain the plurality of spring-biased elongated shims within the plurality of longitudinally extending slotted portions.

20. The method of claim 18, further comprising providing a pair of rib portions longitudinally along opposed side surfaces of each of the plurality of spring-biased elongated shims and providing a pair of inwardly extending retaining rib portions along each of the plurality of longitudinally extending slotted portions to retain the pair of rib portions of each of the plurality of spring-biased elongated shims.

* * * * *